United States Patent
Son

(10) Patent No.: US 11,584,040 B2
(45) Date of Patent: Feb. 21, 2023

(54) METHOD FOR PREPARING NATURAL FIBER COMPOSITE MATERIAL FOR INJECTION MOLDING BY USING CONVERGENT NOZZLE HEATING JIG

(71) Applicant: KeunSoo Son, Nam-Gu Ulsan (KR)

(72) Inventor: KeunSoo Son, Nam-Gu Ulsan (KR)

( * ) Notice: Subject to any disclaimer, the term of this patent is extended or adjusted under 35 U.S.C. 154(b) by 211 days.

(21) Appl. No.: 16/960,030

(22) PCT Filed: Nov. 18, 2019

(86) PCT No.: PCT/KR2019/015789
§ 371 (c)(1),
(2) Date: Jul. 3, 2020

(87) PCT Pub. No.: WO2020/105996
PCT Pub. Date: May 28, 2020

(65) Prior Publication Data
US 2021/0053255 A1 Feb. 25, 2021

(30) Foreign Application Priority Data
Nov. 22, 2018 (KR) ......................... 10-2018-0144983

(51) Int. Cl.
| C08L 23/12 | (2006.01) |
| B29B 9/06 | (2006.01) |
| B29B 9/14 | (2006.01) |
| C08J 5/04 | (2006.01) |
| C08L 23/06 | (2006.01) |
| C08L 27/06 | (2006.01) |
| C08L 67/02 | (2006.01) |
| D02G 3/04 | (2006.01) |
| D02J 1/04 | (2006.01) |
| D02J 13/00 | (2006.01) |
| B29K 301/12 | (2006.01) |
| B29K 311/10 | (2006.01) |

(52) U.S. Cl.
CPC .................. *B29B 9/06* (2013.01); *B29B 9/14* (2013.01); *C08J 5/048* (2013.01); *C08L 23/06* (2013.01); *C08L 23/12* (2013.01); *C08L 27/06* (2013.01); *C08L 67/02* (2013.01); *D02G 3/04* (2013.01); *D02J 1/04* (2013.01); *D02J 13/00* (2013.01); *B29K 2301/12* (2013.01); *B29K 2311/10* (2013.01); *C08J 2323/06* (2013.01); *C08J 2323/12* (2013.01); *C08J 2327/06* (2013.01); *C08J 2367/02* (2013.01)

(58) Field of Classification Search
CPC .... B29B 9/06; B29B 9/14; B29B 7/92; B29B 9/10; B29B 9/12; B29B 15/12; C08J 5/048; C08J 2323/06; C08J 2323/12; C08J 2327/06; C08J 2367/02; C08L 23/06; C08L 23/12; C08L 27/06; C08L 67/02; C08L 23/0853; C08L 31/04; C08L 77/00; C08L 2205/16; D02G 3/04; D02J 1/04; D02J 13/00; B29K 2311/10; B29K 2301/12; B29K 2023/06; B29K 2023/083; B29K 2023/12; B29K 2027/06; B29K 2067/003
USPC ......................................................... 264/141
See application file for complete search history.

(56) References Cited

U.S. PATENT DOCUMENTS

| 6,102,384 A * | 8/2000 | Simmons ........... B23K 37/0536 269/37 |
| 2015/0298377 A1* | 10/2015 | Sakurada .............. B23P 15/007 29/283 |

FOREIGN PATENT DOCUMENTS

| JP | 2011020443 A | 2/2011 |
| KR | 1020020093065 A | 12/2002 |
| KR | 1020030021362 A | 3/2003 |
| KR | 1020160050685 A | 5/2016 |
| KR | 1020180068731 A | 6/2018 |

OTHER PUBLICATIONS

International Search Report in corresponding International Application No. PCT/KR2019/015789 dated Mar. 18, 2020, 5 pages.

* cited by examiner

*Primary Examiner* — Hannah J Pak

(57) ABSTRACT

The present invention relates to a manufacturing method of a natural fiber composite material for injection molding using a reduced nozzle heating jig, and particularly, to a manufacturing method of a natural fiber composite material for injection molding using a reduced nozzle heating jig, which is configured to include: combining natural fibers and synthetic fibers (S1); heat-pressing the combined ply yarn while passing through a reduced nozzle heating jig 100 and melting and pressing the synthetic fibers and fusing the synthetic fibers to the natural fibers (S2); and palletizing the mixed ply yarn (S3).

4 Claims, 3 Drawing Sheets

METHOD FOR PREPARING NATURAL FIBER COMPOSITE MATERIAL FOR INJECTION MOLDING BY USING CONVERGENT NOZZLE HEATING JIG

TECHNICAL FIELD

The present invention relates to a method for manufacturing a natural fiber composite material for injection molding using a convergent nozzle heating jig, and particularly, to a method for manufacturing a natural fiber composite material for injection molding using a convergent nozzle heating jig, which is configured to include: combining natural fibers and synthetic fibers; heat-pressing the combined ply yarn while passing through a reduced nozzle heating jig and melting and pressing the synthetic fibers and fusing the synthetic fibers to the natural fibers; and palletizing the mixed ply yarn.

TECHNICAL FIELD

Natural fiber composite materials are characterized in that raw materials can be easily acquired from waste resources (wooden raw materials such as wood waste residues, small hardwood, thinning wood, rice husk or rice husk powder derived from agricultural by-products, MDF processed by-product powder generated during MDF processing, tannin powder, etc.) and can comparatively easily complexed and recycled, and the development and spread of technologies that can use these plastics and wood materials in large quantities are very important to solve a problem of insufficient wood resources at the same time.

In addition, unlike conventional inorganic raw materials, it is inexpensive to manufacture a composite material by using a material derived from the natural as reinforcement fillers, the material can be non-toxic, an impact on environmental pollution can be minimized due to recycling of waste resources. Natural materials used for natural fiber composite materials have many advantages in solving environmental problems that will emerge as bit problems in a coming future, and as a result, the natural materials are actually used for automobile and building industries in Europe and U.S.A., at present.

Most of the natural fiber composite materials currently being used or researched are used as building deck materials by adding natural fibers to polyolefin (PP, PE, PS)-based polymers, which are currently used most in a polymer industry, and are also being practically used or developed as structural or packing materials or automotive interior materials.

The manufacturing of the natural fiber composite materials is largely classified into a nonwoven web process and a melt blending process, and a research into natural fiber-plastic composite materials manufactured by the melt blending process is most actively conducted. In addition, a possibility to substitute existing calcium carbonate (CaCO3), talc, clay, etc., has been sounded while integrating processing technology used in the existing plastic industry, and these natural fibers are used as the reinforcement filler of a synthetic resin reinforce to show a significant possibility from an environmental point of view.

Further, as an advantage obtained by using the natural fibers as the reinforcement filler, a density of a final product can be lowered, abrasiveness of a processing machine can be reduced, and a price is low. On the contrary, as a disadvantage, there are incompatibility between polar lignocellulose-based raw materials and non-polar thermoplastic polymers and biodegradable polymers, moisture non-resistance, inferiority to weather resistance, and the like.

In regard to such a natural fiber composite material, as the related art, "Preparation Method of Natural Fiber-reinforced Plastic for Car Interior and Natural Fiber-rein-forced Plastic for Car Interior Prepared by the Same (Korean Patent Unexamined Publication No. 10-2016-0023967)" discloses technology that first mixes 5 to 35 wt % of natural fiber having an average length of 5 mm or more and 1 to 10 wt % of coupling agent and then inputs 55 to 80 wt % of plastic resin into a main inlet of a twin-screw extruder, and inputs a mixture of the natural fiber and the coupling agent into a side inlet of the twin-screw extruder and performs extrusion.

However, the prior art has a problem in that the process is relatively complicated, and efficient and uniform mixing is not guaranteed because natural fibers and plastic resins need to be mixed together with the coupling agent in equipment for performing extrusion and further, has a problem in that harmful effects such as generation of volatile organic compounds (VOC) in the process may be caused by the added coupling agent.

In order to solve these problems, a method for premixing and preparing the natural composite material in the form of a pellet and then immediately using the prepared natural fiber composite material for a conventional extrusion or injection process has been continuously studied. As an existing invention related to pelletization of such a natural fiber composite material, "Manufacturing Method of Kenaf Composite Materials for Interior Product of Motor Vehicles (Korean Patent Unexamined Publication No. 10-2018-0068731)" discloses contents relating to a manufacturing method including: preparing kenaf fibers and polypropylene fibers (S1); combining the kenaf fibers and the polypropylene fibers (S2); coating a surface of the combined ply yarn (S3); and palletizing the coated ply yarn by using an extruder (S4).

However, the prior art also has a problem in that harmful effects such as VOC generation in the process may be caused by raw materials used as coating agents. Further, since the surface of the combined ply yarn is just coated with the coating agent, there are many cases in which a crevice between the combined natural fiber and polypropylene fiber remains in a bubble state as it is even by considering that the coating agent is impregnated. Therefore, in a subsequent injection or extrusion process, there is a problem in that defects are easily generated or a decrease in process efficiency is likely to occur due to the remaining bubbles.

DISCLOSURE

Technical Problem

The present invention has been made in an effort to provide a method for manufacturing a natural fiber composite material for injection molding using a convergent nozzle heating jig, which heat-presses a combined ply yarn while passing through a convergent nozzle heating jig without addition of a separate binder to melt and press the synthetic fibers and fusing the synthetic fibers to the natural fibers, thereby fundamentally removing generation of harmful materials by addition of the binder and minimizing existence of a crevice or bubbles therein through fusion by pressing.

Furthermore, the present invention has been made in an effort to prevent a problem in that natural fibers exhibiting relatively low thermal stability are carbonized by performing fusion by pressing at a comparatively low temperature within a short time by performing both heating and pressing.

Technical Solution

In order to solve the problem, a method for manufacturing a natural fiber composite material for injection molding using a convergent nozzle heating jig of the present invention is configured to include: combining natural fibers and synthetic fibers (S1); heat-pressing the combined ply yarn while passing through a convergent nozzle heating jig 100 and melting and pressing the synthetic fibers and fusing the synthetic fibers to the natural fibers (S2); and palletizing the mixed ply yarn (S3).

Further, the convergent nozzle heating jig 100 is configured to include a jig body 110, one or more convergent nozzles 120 formed in the jig body 110, and one or more heating heaters 130 installed in the jig body 110, and the convergent nozzle 120 is configured to further include a derivation introduction unit 121, a convergent heating pressing unit 122 formed subsequently to the derivation introduction unit 121 and having an inner diameter which is gradually reduced, and a heat-pressing unit 123 formed subsequently to the convergent heat-pressing unit 122.

In addition, an inner diameter d1 of the heat-pressing unit 123 is formed to be smaller than an outer diameter d0 of the ply yarn.

Meanwhile, the natural fiber is configured to include any one of flax (linen), hemp, jute, kenaf, abaca, bamboo, coir, pineapple, ramie, sisal, and henequen, and the synthetic fiber is configured to include any one of polypropylene (PP), polyethylene (PE), polyvinyl chloride (PVC), ethylene-vinyl acetate (EVA), nylon, and poly ethylene terephthalate (PET).

Advantageous Effects

According to the present invention, there is an advantage in that a combined ply yarn is heat-pressed while passing through a convergent nozzle heating jig without addition of a separate binder to melt and press the synthetic fibers and then the synthetic fibers are fused to the natural fibers, thereby fundamentally removing generation of harmful materials by addition of the binder.

Furthermore, there is an advantage in that existence of a crevice or bubbles is minimized through fusion by pressing to minimize defects or deterioration in process efficiency which may occur in an injection process and a mechanical strength of a manufactured pellet is relatively high to reduce damage during storage or transportation.

Furthermore, there is an advantage in that fusion by pressing is performed at a comparatively low temperature within a short time by performing both heating and pressing to prevent a problem in that natural fibers exhibiting relatively low thermal stability are carbonized.

Meanwhile, since the natural fiber composite material is manufactured so that an outer diameter and a shape maintain constant standards after passing through a convergent nozzle heating jig, there is an advantage in that it is possible to manufacture pellets having a uniform quality.

DESCRIPTION OF OF REFERENCE NUMERALS USED IN DRAWINGS

Figure 1:
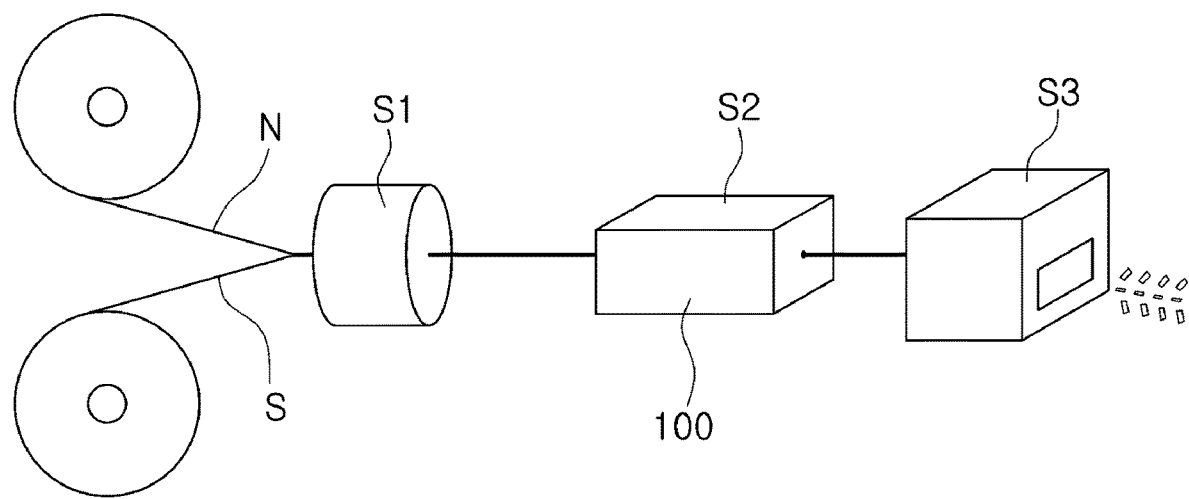
FIG. 1 is a diagram illustrating a method for manufacturing a natural fiber composite material for injection molding using a convergent nozzle heating jig according to an embodiment of the present invention.

N: Natural fiber
S: Synthetic fiber
C: Crevice
100: Convergent nozzle heating jig
110: Jig body
120: Convergent nozzle
121: Derivation introduction unit
122: Convergent heating pressing unit
123: Heating pressing unit
130: Heating heater

MODE FOR INVENTION

Hereinafter, a method for manufacturing a natural fiber composite material for injection molding using a convergent nozzle heating jig according to an embodiment of the present invention will be described in detail with reference to the accompanying drawings. First, in the drawings, it should be noted that the same constituent elements or components are represented by the same reference numerals. In describing the present invention, a detailed description of known functions and configurations incorporated will be omitted so as to avoid obscuring the gist of the present invention.

As illustrated in FIG. 1, the method for manufacturing a natural fiber composite material for injection molding using a convergent nozzle heating jig is configured to include: combining natural fibers and synthetic fibers (S1); heat-pressing the combined ply yarn while passing through a convergent nozzle heating jig 100 and melting and pressing the synthetic fibers and fusing the synthetic fibers to the natural fibers (S2); and palletizing a mixed ply yarn (S3).

In this case, the natural fibers are preferably configured to include any one of flax, linen, hemp, jute, kenaf, abaca, bamboo, coir, pineapple, ramie, sisal, and henequen. As a most preferred embodiment, the natural fiber is preferably configured to include kenaf. Meanwhile, the synthetic fiber is preferably configured to include any one of poly-propylene (PP), polypthylene (PE), polyvinyl chloride (PVC), pthylene vinyl acetate (EVA), nylon, and poly ethylene terephthalate (PET).

First, the step (S1) of combining the natural and synthetic fibers will be described. In the combining step (S1), due to characteristics of the present invention in which a fusion process is performed by pressing in addition to heating, it is characterized in that the combining of the natural fibers and the synthetic fibers may be formed by comparatively various embodiments. In other words, in addition to a case where the natural fibers and the synthetic fibers are uniformly or regularly arranged in the ply yarn even in a case where the natural fibers and the synthetic fibers are arranged irregularly to some extent or a distribution of the natural fibers and the synthetic fibers is biased to either side, fused synthetic fibers are not simply attached to the natural fibers, but the synthetic fibers fused to the natural fibers are also fused by pressing, and as a result, the synthetic fibers fused to the natural fibers may be fused and mixed uniformly to some extent.

Next, the step (S2) of heat-pressing the combined ply yarn while passing through the reduced nozzle heating jig 100 and melting and pressing the synthetic fibers and fusing the synthetic fibers to the natural fibers will be described. In this step, the combined ply yarn is heat-pressed while passing through the convergent nozzle heating jig 100 having the configuration illustrated in FIG. 2. In this process, the synthetic fibers are melted and pressed to be fused to the natural fibers as illustrated stepwise in FIG. 3. There is an advantage in that more efficient fusion may be performed by pressing is performed at a comparatively low temperature within a short time by the characteristics in that both heating and pressing are performed to prevent a problem in that natural fibers exhibiting relatively low thermal stability are carbonized.

Meanwhile, by the characteristic that the synthetic fibers are melted and pressed to be fused to the natural fibers by heat-pressing without the need to add the separate binder, the melted and fused synthetic fibers themselves serve as a kind of binder, so that there is an advantage in that it is possible to fundamentally remove the generation of the harmful materials by the addition of the binder.

Figure 2:
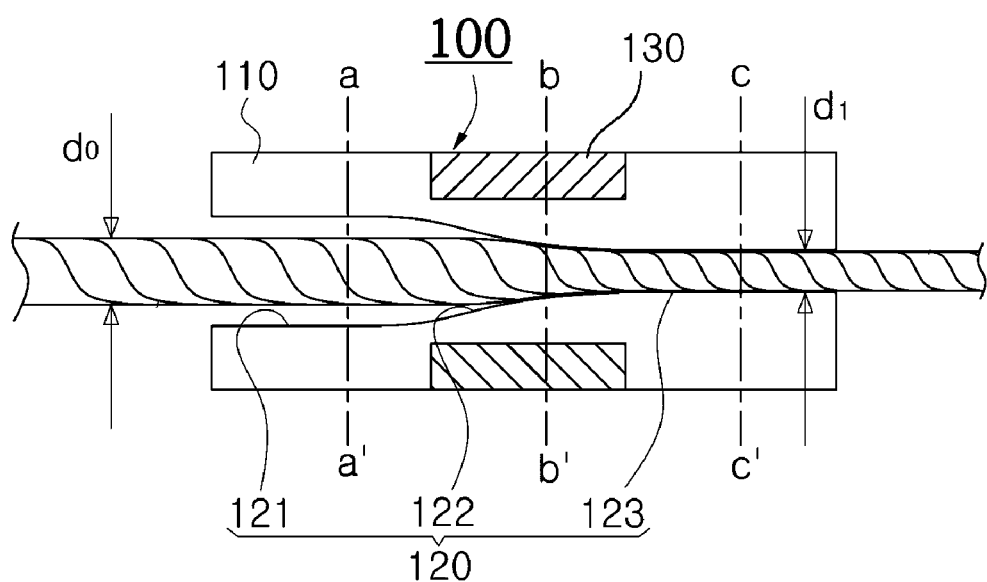
FIG. 2 is a diagram illustrating a structure of the convergent nozzle heating jig according to an embodiment of the present invention

In this case, as illustrated in FIG. 2, the convergent nozzle heating jig 100 is preferably configured to include a jig body 110, one or more convergent nozzles 120 formed in the jig body 110, and one or more heating heaters 130 installed in the jig body 110. Meanwhile, as illustrated in FIG. 2, the convergent nozzle 120 is preferably configured to include a derivation introduction unit 121, a convergent heating pressing unit 122 formed subsequently to the derivation introduction unit 121 and having an inner diameter which is gradually convergent, and a heat-pressing unit 123 formed subsequently to the convergent heat-pressing unit 122.

Meanwhile, in order to efficiently remove a crevice C which exists between the natural fibers and synthetic fibers, an inner diameter d1 of the heat-pressing unit 123 is preferably formed to be smaller than an outer diameter d0 of the combined ply yarn. More specifically, in respect to the inner diameter d1 of the heat pressing unit 123, a cross-sectional area of the heat-pressing unit 123 is preferably close to the sum of the cross-sectional area of the natural fibers and the cross-sectional area of the synthetic fibers.

Figures 3A, 3B, 3C:
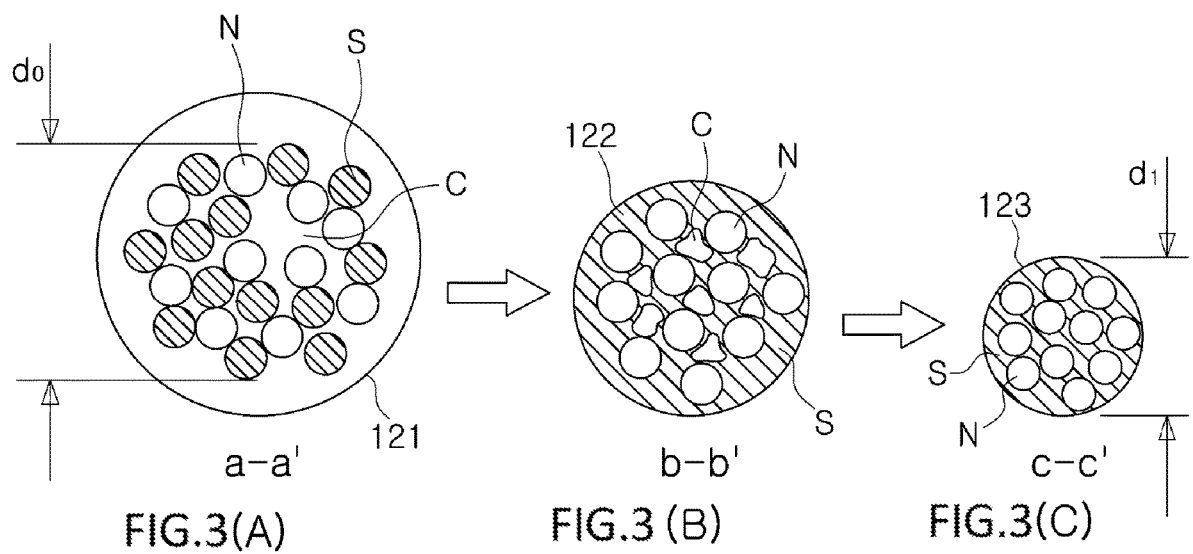
FIGS. 3(A), 3(B), and 3(C) are diagrams illustrating a processing process of a ply yarn when passing through each part (a-a*, b-b*, or c-c*) of a convergent nozzle heating jig in a method for manufacturing a natural fiber composite material for injection molding using a convergent nozzle heating jig according to an embodiment of the present invention.

In the process in which the synthetic fiber is melted and pressed to be fused to the natural fiber, the crevice C which has existed between the combined natural fiber and synthetic fiber as illustrated in FIG. 3(A) is gradually reduced while the synthetic fiber is pressed, which is melted while passing through the convergent reduced heat-pressing unit 122 as illustrated in FIG. 3(B) and then finally disappears as illustrated in FIG. 3(C) while passing through the heat-pressing unit 123. Accordingly, there is an advantage in that existence of a crevice or bubbles is minimized to minimize defects or deterioration in process efficiency which may occur in an injection process and a mechanical strength of a manufactured pellet is relatively high to reduce damage during storage or transportation. Further, since the natural fiber composite material is manufactured so that an outer diameter and a shape maintain constant standards after passing through a reduced nozzle heating jig, there is an advantage in that it is possible to manufacture pellets having a uniform quality.

Hereinabove, optimal embodiments are disclosed in the drawings and the specification. Although specific terms have been used herein, the terms are only used for the purpose of describing the present invention and are not used to limit the scope of the present invention as defined in the claims. Therefore, it will be appreciated by those skilled in the art that various modifications and other embodiments equivalent thereto can be made therefrom. Accordingly, the true technical scope of the present invention should be defined by the technical spirit of the appended claims.

The invention claimed is:

1. A method for manufacturing a natural fiber composite material for injection molding using a convergent nozzle heating jig, comprising:
   combining natural fibers and synthetic fibers to form a combined ply yarn;
   heat-pressing the combined ply yarn while passing through a convergent nozzle heating jig, and melting and pressing the synthetic fibers and fusing the synthetic fibers to the natural fibers to form a mixed ply yarn;
   palletizing the mixed ply yarn wherein the convergent nozzle heating jig includes
   a jig body,
   one or more convergent nozzles formed in the jig body, and
   one or more heating heater installed in the jig body, and
   the convergent nozzle further includes a derivation introduction unit,
   a convergent heating pressing unit formed subsequently to the derivation introduction unit and
   a heating pressing unit formed subsequently to the convergent heat pressing unit.

2. The manufacturing method of claim 1, wherein an inner diameter d1 of the heat-pressing unit is smaller than an outer diameter d0 of the combined ply yarn.

3. The manufacturing method of claim 1, wherein the natural fiber includes any one of flax, linen, hemp, jute, kenaf, abaca, bamboo, coir, pineapple, ramie, sisal, and henequen, and
   the synthetic fiber includes any one of polypropylene (PP), polyethylene (PE), polyvinyl chloride (PVC), ethylene-vinyl acetate (EVA), Nylon, and polyethylene terephthalate (PET).

4. The manufacturing method of claim 2, wherein the natural fiber includes any one of flax, linen, hemp, jute, kenaf, abaca, bamboo, coir, pineapple, ramie, sisal, and henequen, and the synthetic fiber includes any one of polypropylene (PP), polyethylene (PE), polyvinyl chloride (PVC), ethylene-vinyl acetate (EVA), Nylon, and polyethylene terephthalate (PET).

* * * * *